(12) United States Patent
Aritomi

(10) Patent No.: US 8,861,031 B2
(45) Date of Patent: Oct. 14, 2014

(54) PRINTING USING A SELECTED COLOR MATERIAL

(75) Inventor: Masanori Aritomi, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 239 days.

(21) Appl. No.: 13/030,034

(22) Filed: Feb. 17, 2011

(65) Prior Publication Data

US 2011/0205566 A1 Aug. 25, 2011

(30) Foreign Application Priority Data

Feb. 24, 2010 (JP) ................................. 2010-038827

(51) Int. Cl.
| | | |
|---|---|---|
| H04N 1/40 | (2006.01) | |
| H04N 1/56 | (2006.01) | |
| H04N 1/387 | (2006.01) | |
| G03G 15/00 | (2006.01) | |
| H04N 1/00 | (2006.01) | |
| B41J 2/525 | (2006.01) | |
| G03G 15/36 | (2006.01) | |
| B41J 2/21 | (2006.01) | |

(52) U.S. Cl.
CPC ............... *B41J 2/2103* (2013.01); *H04N 1/56* (2013.01); *H04N 1/387* (2013.01); *G03G 15/502* (2013.01); *H04N 1/00413* (2013.01); *B41J 2/525* (2013.01); *G03G 15/36* (2013.01)
USPC ........................................... 358/2.1; 358/1.9

(58) Field of Classification Search
CPC ..... H04N 1/00413; H04N 1/387; H04N 1/56; G03G 15/36
USPC .......................................... 358/1.14, 1.9, 2.1
See application file for complete search history.

(56) References Cited

U.S. PATENT DOCUMENTS 5,581,377 A * 12/1996 Shimizu et al. ............... 358/540
7,131,775 B2 11/2006 Uchida et al.
(Continued)

FOREIGN PATENT DOCUMENTS

| JP | 2005-22283 | 1/2005 |
|---|---|---|
| JP | 2005-092696 A | 4/2005 |

(Continued)

OTHER PUBLICATIONS

Great Britain Office Action dated May 26, 2011 in corresponding Great Britain Application No. 1102230.8.

(Continued)

*Primary Examiner* — Benny Q Tieu
*Assistant Examiner* — Quyen V Ngo
(74) *Attorney, Agent, or Firm* — Fitzpatrick, Cella, Harper & Scinto

(57) ABSTRACT

When a color selected for use in printing an additional image is not included in colors selected for normal printing, the color for the additional image is changed to an appropriate color, and an increase in cost is avoided. In the color deciding process, a controller examines a color mode at step (S702), and, in this case, identifies the color mode as a two-color mode (S703). When at step (S710), the controller determines that application of an additional image has been designated, at step S711 the controller examines two-color detailed settings. Thereafter, when at step (S720) the controller determines mode 1 is the designated two-color detailed setting, and at step (S721) determines the color selected for an additional image is not black, the processing advances to step (S722), and the controller changes the color for the additional image to black.

5 Claims, 14 Drawing Sheets

(56) References Cited

U.S. PATENT DOCUMENTS

| | | |
|---|---|---|
| 7,474,446 B2 | 1/2009 | Horiuchi et al. |
| 2002/0097436 A1* | 7/2002 | Yokoyama et al. ............ 358/2.1 |
| 2005/0135856 A1 | 6/2005 | Uchida et al. ................. 399/411 |

FOREIGN PATENT DOCUMENTS

| | | |
|---|---|---|
| JP | 2005-193442 A | 7/2005 |
| JP | 2005-193648 A | 7/2005 |

OTHER PUBLICATIONS

Chinese Office Action dated Apr. 1, 2013 for corresponding Chinese Appln. No. 201110044775.5, with English translation.

Chinese Office Action dated Sep. 11, 2013 in corresponding Chinese Appl. No. 201110044775.5.

* cited by examiner

|  | BLACK | CYAN | MAGENTA |
|---|---|---|---|
| Bk+R | BLACK | BLACK | MAGENTA |
| Bk+G | BLACK | CYAN | BLACK |
| Bk+B | BLACK | CYAN | MAGENTA |
| Bk+C | BLACK | CYAN | BLACK |
| Bk+M | BLACK | BLACK | MAGENTA |
| Bk+Y | BLACK | BLACK | BLACK |

PRINTING USING A SELECTED COLOR MATERIAL

BACKGROUND OF THE INVENTION

1. Field of the Invention

The present invention relates to a printing apparatus and to a control method and a program for the printing apparatus, and particularly relates to a printing apparatus that outputs an additional image, such as a copy-forgery-inhibited pattern image, and a control method and a program for the printing apparatus.

2. Description of the Related Art

In the printing industry today, four (or full) color, CMYK printing is most commonly employed for color printing. However, since such color printing requires materials, e.g. toners or inks, for printing four different colors (which are combined in varying proportions to create the full range of colors), the operating costs are high. As one result of this, M color printing has become the object of attention where M denotes a value of two or greater, and equal to or smaller than, a value of N−1, where N denotes the number of color materials available or loading into a printing apparatus (so N denotes the number of different color materials that can be loaded into a printing apparatus). Thus for a four-color printing apparatus (where N is 4), M is 2 or 3.

A two-color printing technique is disclosed in Japanese Patent Laid-Open No. 2005-022283. According to this conventional art, the printing of images is performed using only two, user-selected colors.

Furthermore, an additional image, such as a copy-forgery-inhibited pattern image, is disclosed in this conventional art, and for this image, the user is also permitted to select the color to be employed. Specifically, the user may not only selectively designate the two colors for normal printing, but may also select the color to be used for the additional image. Thus, since the user can select the individual and arbitrary colors both for normal printing and for the additional image, there is a case wherein the colors used for normal printing and for the additional image differ, i.e., wherein a color not to be used for normal printing is designated as the color for the additional image.

That is, when a color selected to be used for an additional image is included as either of the colors selected for normal printing, no problem will be encountered in performing printing in accordance with the user's selections. However, a problem does occur when a color selected for an additional image is not included among the colors chosen for normal printing. In this case, although the number of colors used for normal printing is reduced to two, another color must be prepared and used for printing the additional image, and the desired effects provided by limiting the number of colors can not be obtained. In Japanese Patent Laid-Open No. 2005-022283 above, this problem is resolved by changing the color selected for the additional image, i.e., by changing the color selected for the additional image to one of the two colors, other than black, selected for normal printing. It should be noted here that a copy-forgery-inhibited pattern image (e.g. a security pattern image such as a copy-deterrent pattern image) is formed using large dots and small dots, and in printed matter, it is difficult for persons to see a difference in the densities between an area wherein large dots were deposited and an area wherein small dots were deposited, but on a duplicate obtained by copying this printed matter, it is easy to see the difference in the densities on the duplicate. The difference in the densities thus indicates to a reader that the duplicate is unauthorized. This occurs because the small dots may have disappeared or have become faded while being copied. When an additional image is employed only for documents for which reproduction is restricted, unauthorized use can be prevented.

When the color for an additional image is changed to a color other than black, a relatively more expensive color material (a toner or an ink) is employed for printing the additional image. This is an especially great problem for Japanese Patent Laid-Open No. 2005-022283, because the color originally selected by a user for an additional image is changed and a different substitute color is employed, and as a result of the employment of this color for the additional image, a higher color cost is incurred. When cyan, for example, is employed as the color for an additional image, the color cost is increased because cyan material is generally more expensive than black material. Moreover, when blue, for example, is selected as the color for an additional image, two color materials, cyan and magenta, are actually employed, and the color cost becomes even greater.

The present invention is provided to resolve the color cost problem. According to this invention, when a color selected for an additional image is not included among a plurality of colors selected for use for normal printing, the color selected for an additional image is changed to a proper color. One advantage of the present invention is to provide a printing apparatus that suppresses increase in cost by changing a color to be used for an additional image in the above described manner, and a control method and a program for the printing apparatus.

SUMMARY OF THE INVENTION

To achieve this advantage, an apparatus according to the present invention comprises: a selector for selecting M colors (M is a value of two or greater to N−1 or smaller) as those of color materials to be used for printing of a document image based on a designation received from a user; and a receiving unit for receiving, from the user, a designation indicating a color for an additional image that is to be applied to the document image, when the selector has selected the M colors and the receiving unit has received from the user the designation indicating a color for an additional image, black is selected as a color material to be used for printing the additional image.

According to this invention, it is possible to provide a printing apparatus that, in a case wherein the color selected for an additional image is not included in a plurality of colors selected for normal printing, changes the color for the additional color to an appropriate (proper) color and suppresses increase in cost, and a control method and program for the printing apparatus.

Further features of the present invention will become apparent from the following description of exemplary embodiments (with reference to the attached drawings).

DESCRIPTION OF THE EMBODIMENTS

The present invention will now be described while referring to the accompanying drawings.

A printing apparatus is employed for the following explanation; however, the present invention is not limited to the configuration employed for this apparatus.

Embodiment

Two-color printing is employed, as an example, throughout the following description.

(Configuration of a Printing Apparatus)

Figure 1:
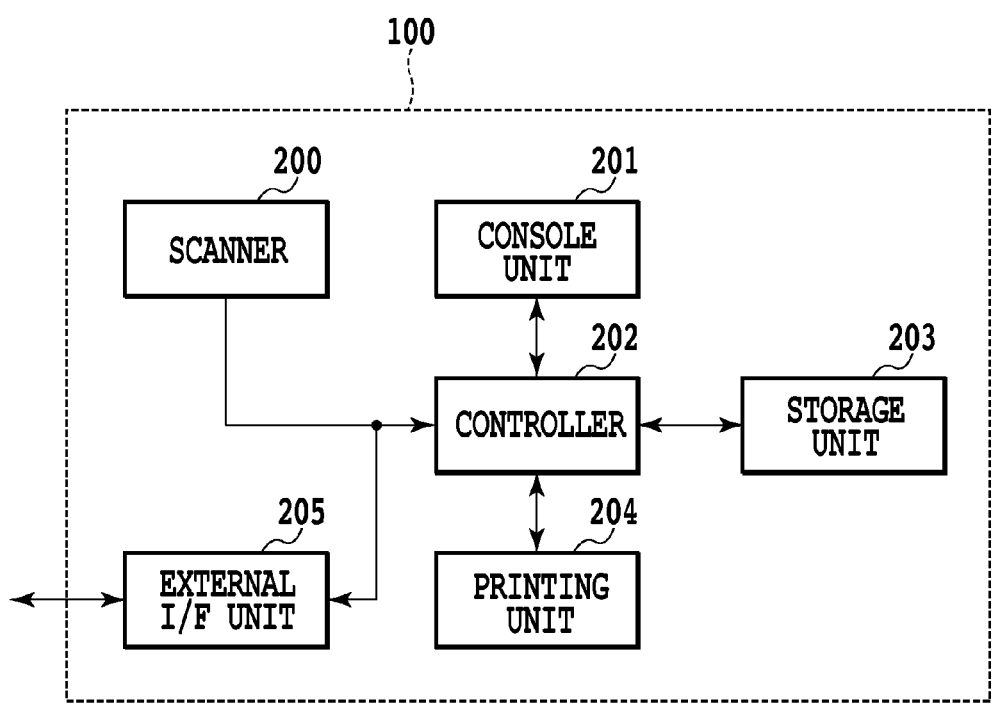
FIG. 1 is a block diagram illustrating an example arrangement for a printing apparatus according to one embodiment of the present invention.

FIG. 1 is a block diagram illustrating an example configuration for a printing apparatus 100, according to one embodiment of the present invention. The printing apparatus 100 is a multi-function peripheral (MFP) that performs a plurality of functions, including a copying function and a printing function. The printing apparatus 100 may be a single-function printing apparatus that performs only one function, such as a copying function or a printing function. In the printing apparatus 100, a scanner 200 scans a document (e.g. manuscript) and generates image data that are transmitted, thereafter, to another unit of the printing apparatus 100.

A console unit 201 includes an operating panel, which will be described later, and provides various displays on the operating panel to accept print color designations, for example, entered by a user. An external I/F unit 205 is an interface for the reception and transmission of data between devices, connected to a network, and the printing apparatus 100. A storage unit 203 is a large capacity memory device for storing data received from the scanner 200 and the external I/F unit 205. This storage unit 203 may be either a hard disk or a flash memory, or another, arbitrary storage device that is known to the technical field of this invention may also be employed.

A printing unit 204 performs printing based on image data that are received by one of the units of the printing apparatus 100. A controller 202 provides overall control for the operation of and the processing performed by the various units included in the printing apparatus 100. To accomplish this, the controller 202 employs programs that are stored, for example, in a ROM controlled by the controller 202, and performs the processing shown in flowcharts that will be described later.

Example Basic Operation of the Printing Apparatus

Figure 2:
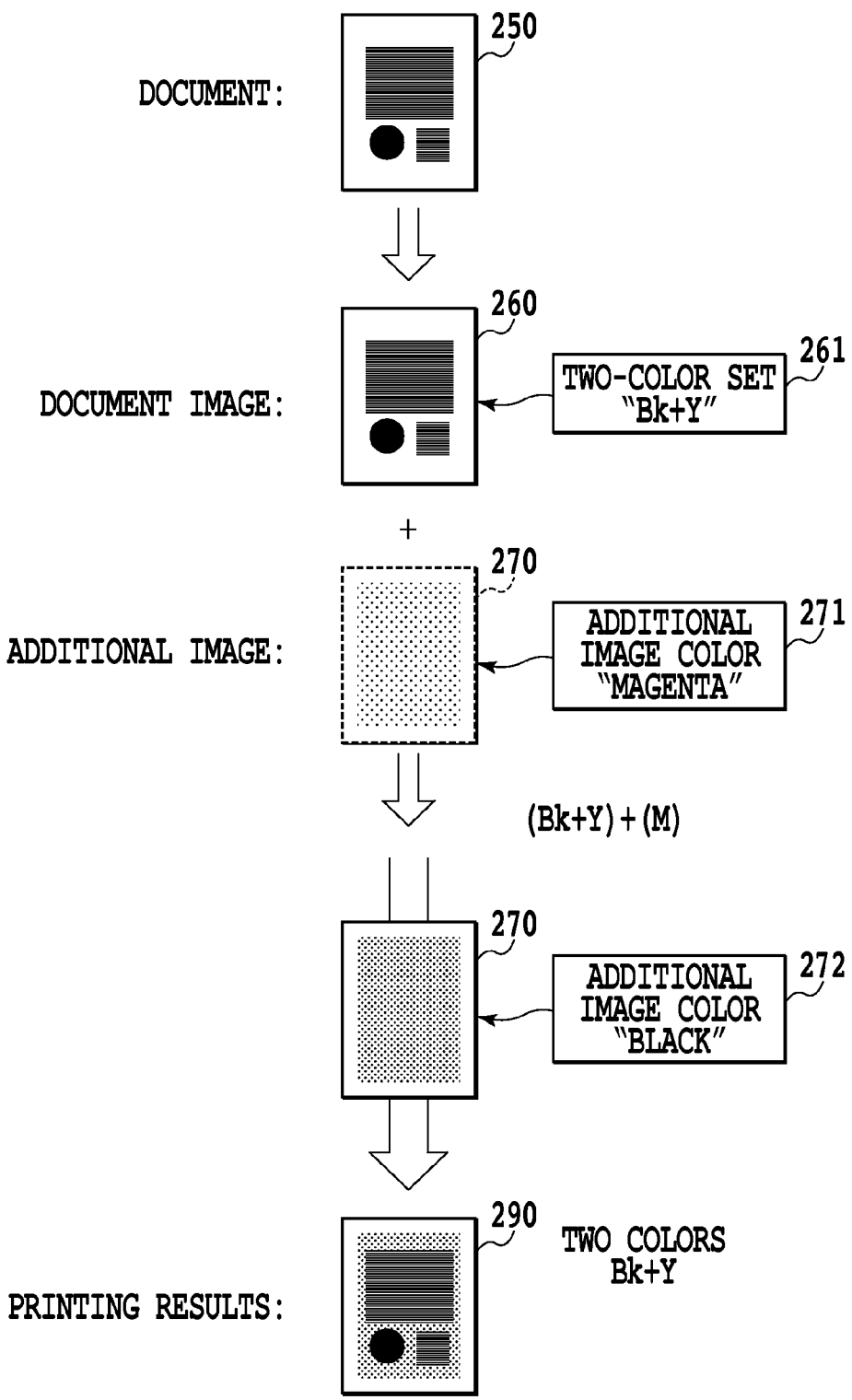
FIG. 2 is a diagram illustrating an example basic operation performed by the printing apparatus.

FIG. 2 is a diagram illustrating an example basic operation performed by the printing apparatus 100. An example result obtained by two-color printing, while an additional image was applied to a document image, will now be described while referring to FIG. 2. That is, a case wherein M-color printing (two-color printing in this embodiment) is performed by employing a printing apparatus compatible with N-color printing (four-color printing, in this embodiment) will be described. First, a document image 260 is generated by scanning a document 250. Since black+yellow is designated as a two-color set 261, the document image 260 is formed using black and yellow. Then, an additional image 270, which is to be applied to the document image 260, is prepared. Assume, in this setup case, that magenta is designated as an additional image color 271. Then, when the color process is performed for the document image 260 and the additional image 270 and the resultant images are superimposed and printed, a three-color image, (black+yellow)+magenta, is obtained, and the selection of two-color printing is rendered useless.

Therefore, in this embodiment, for the additional image color 271, magenta is changed to black, and this updated additional image color 272 is employed to form an additional image 270. Thus, when a color process is performed for the document image 260 and the additional image 270 and the resultant images are superimposed, a printing result 290 is obtained, i.e., a two-color, black and yellow, printing result is provided by this embodiment, and an additional image is printed in black.

Furthermore, when the color for an additional image is changed to yellow, instead of to black, the two-color, black and yellow, printing result 290 can still be obtained. Generally, however, when an additional image 270, such as a copy-forgery-inhibited pattern image is printed in yellow, it is less effective in discouraging copying. To avoid this and to provide greater effectiveness, black should usually be employed for an additional image. According to the operation of this embodiment, not only two-color printing is maintained, but also, a color can be employed that is more appropriate for an additional image.

An example basic operation performed by the printing apparatus 100 has been described. Next, an example color setting operation, using the console unit 201 of the printing apparatus 100, will be specifically described. In the following explanation, the above described document image 260 and additional image 270 are employed.

(Operation for Selecting a Color for an Additional Image)

Figure 3:
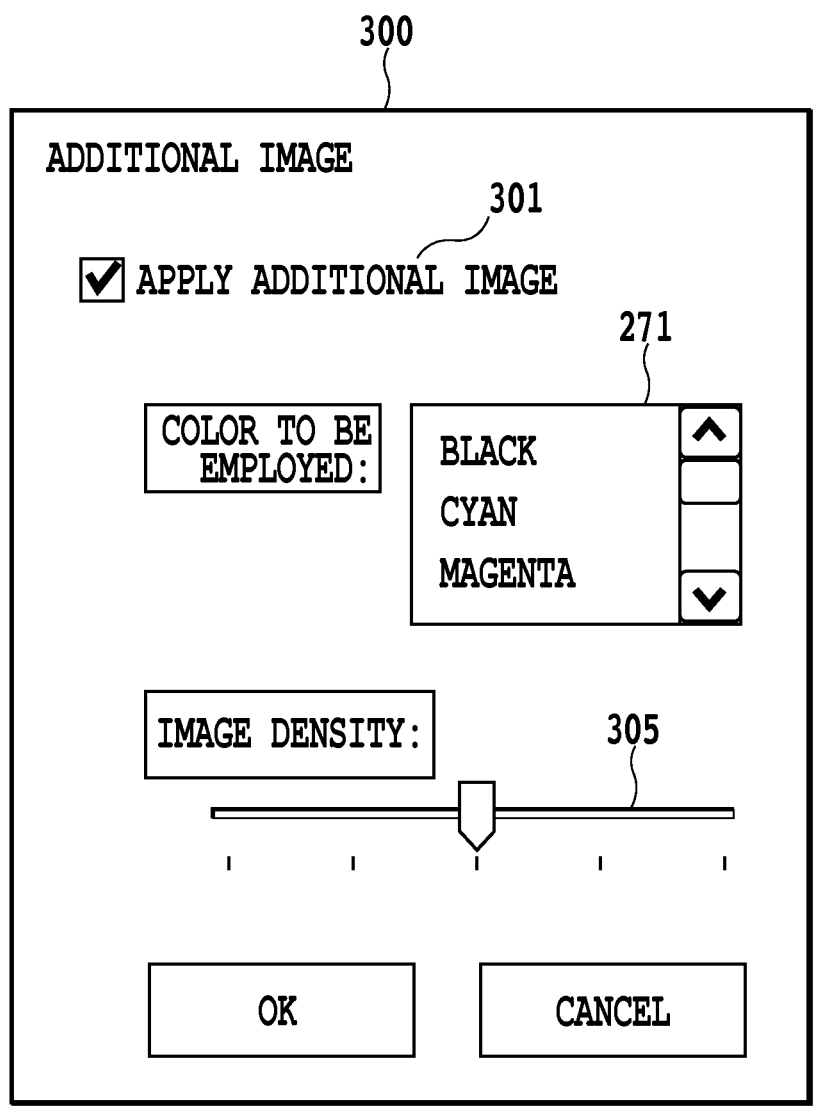
FIG. 3 is a diagram illustrating an example display, on a console unit, that a user employs when selecting a color for an additional image.

An example console unit 201 operation, during which a user selects a color for the additional image 270, will be described while referring to FIG. 3. During this operation, a user enters designations for the additional image 270 in an [Additional image] dialog box 300 displayed on an operating panel (not shown). An [Apply an additional image] check box 301 is provided to permit the user to designate whether or not an additional image 270 is to be applied. When the user has entered a tick (checkmark) in the [Apply additional image] check box 301, the status thereof is ON, and the application of an additional image 270 is designated.

A [Color to be employed] list box 271 is used to select the color for the additional image 270. The user selects a desired color from colors, such as black, cyan and magenta, provided on a list in the [Color to be employed] list box 271. An [Image density] slider 305 is used to set the color density of the additional image 270, and the dot size for the additional image 270 such as a copy-forgery-inhibited pattern image is changed by moving the [Image density] slider 305. In this embodiment, the [Image density] slider 305 is shown as an example control item, and a selected density is stored in correlation with the selected additional image color 271 (storing the setting will be described later).

An example operation, wherein a user employs the console unit 201 to designate the color and the density of the additional image 270, has been described. Hereafter, an example operation will be described wherein a user employs the console unit 201 to select the colors and the operating mode for two-color printing.

(Operation to Select the Colors and the Operating Mode for Two-Color Printing)

Figure 4:
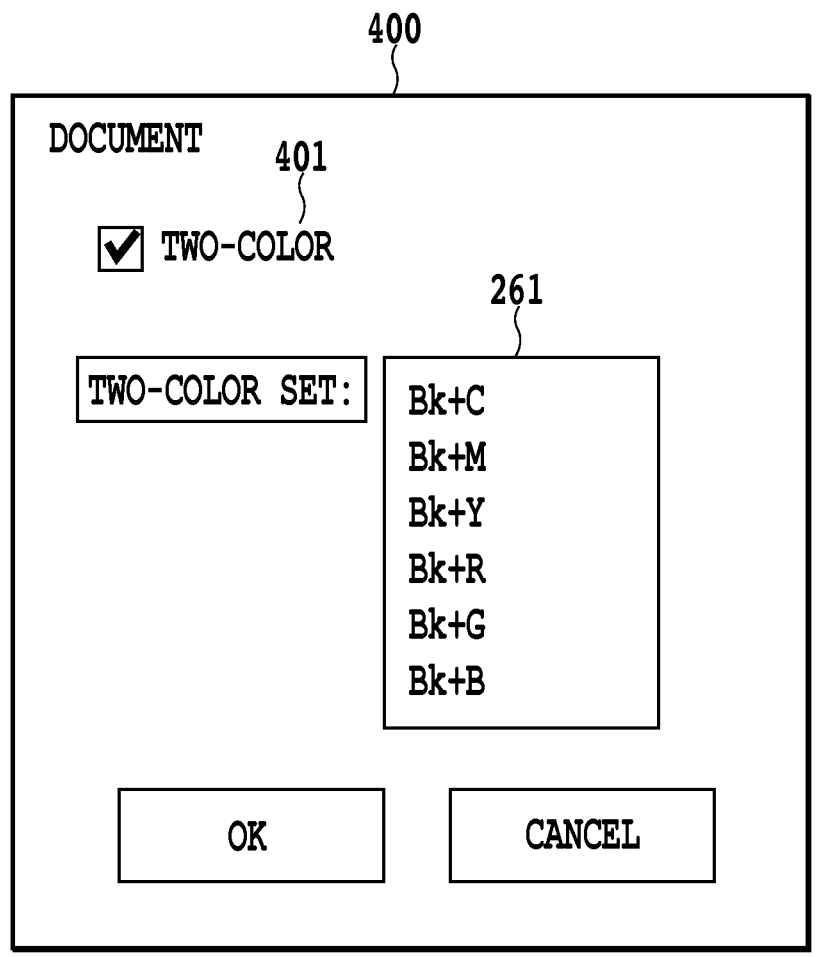
FIG. 4 is a diagram illustrating an example display, on the console unit, that a user employs when selecting the colors and the operating mode for two-color printing.

An example operation, wherein a user employs the console unit 201 to select the colors and the operating mode for two-color printing, will now be described while referring to FIG. 4. A user employs a [Document] dialogue box 400 in FIG. 4 to enter the setting used for printing the document 250, and a [Two-color] check box 401 to indicate whether two-color printing is to be performed. When the [Two-color] check box 401 is set to ON, a two-color mode is designated and two-color printing is to be performed.

Figure 10:
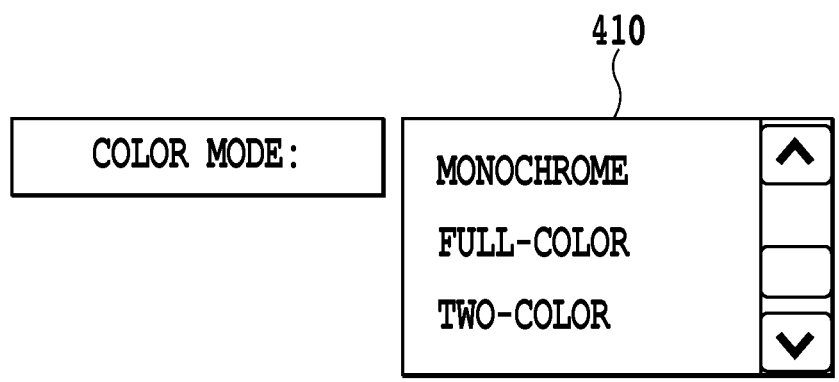
FIG. 10 is a diagram showing another example display, on the console unit, that a user employs when selecting the colors and the operating mode for two-color printing.

A [Two-color sets] list box 261 is used to select colors to be employed for two-color printing of the document 250. The user selects a desired color set from a list, Bk+C, Bk+M, Bk+Y, Bk+R, Bk+G and Bk+B, for example, in the [Two-color sets] list box 261. Referring to FIG. 4, the printing mode can be changed by entering a tick in, or deleting a tick from, the [Two-color] check box 401, or another setting method, as shown in FIG. 10, may also be employed to select two-color printing. That is, a [Color mode] list box 410 may be displayed to provide a list of available color modes. Then, when a user selects [Two-color] in the [Color mode] list box 410, the two-color mode is designated and two-color printing is to be performed.

Figure 11:
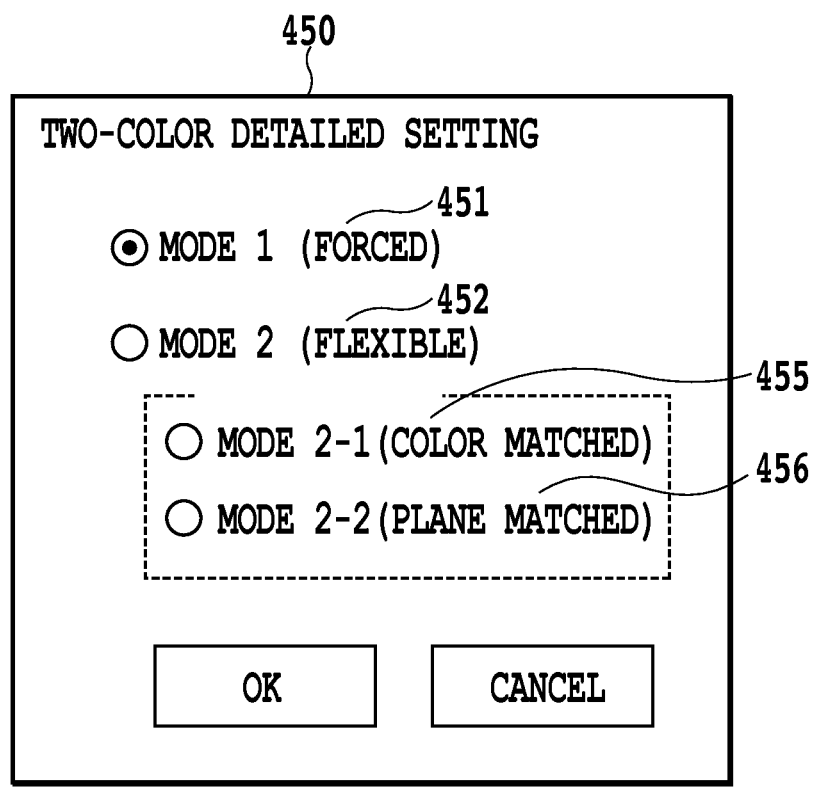
FIG. 11 is a diagram showing an example display, on the console unit, that a user employs when setting details for the colors and the operating mode for two-color printing.

FIG. 11 is a diagram showing an example display, on the console unit 201, in which a user enters a detailed setting for the colors and the operating mode of two-color printing. On a [Two-color detailed setting] dialog box 450 in FIG. 11, the user can enter a detailed setting for an operation, in the two-color mode, wherein an additional image 270, for which a different color has been designated, is present. When the user has selected a [Mode 1 (forced)] button 451, the printing apparatus 100 performs an operation for changing the color of an additional image to a fixed color. That is, regardless of which color the user has selected, the color of the additional image is forcibly changed to a specific color to form the additional image. When the user has selected a [Mode 2 (flexible)] button 452, the operation is determined in accordance with the colors selected for two-color printing and the color selected for an additional image. Furthermore, when the [Mode 2 (flexible)] button 452 has been selected, either a [Mode 2-1 (color matched)] button 455 or a [Mode 2-2 (plane matched)] button 456 can be selected. When the [Mode 2-1 (color matched)] button 455 is selected, the printing apparatus 100 does not change the color selected for an additional image when this color is included in the colors selected for two-color printing. When the [Mode 2-2 (plane matched)] button 456 is selected, the printing apparatus 100 does not change the color selected for an additional image when this color is included in the plane of the colors selected for the two-color printing. These operations will be described later by employing flowcharts, and the user can select these operating modes to perform the printing processing.

The example color setting operation employing the console unit 201 of the printing apparatus 100 has been described. Following this, an example operation performed by a user to issue a copying instruction will be described.

(Operation for Issuing a Copying Instruction)

Figure 5:
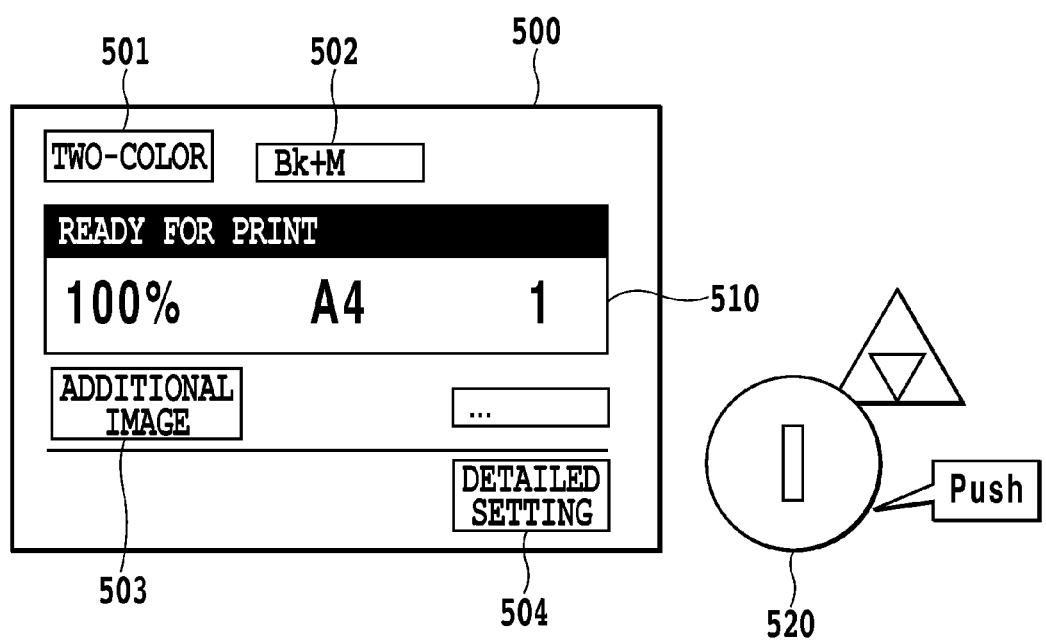
FIG. 5 is a diagram illustrating an example display, on the console unit, that a user employs when entering a copy instruction.

An example operation wherein a user issues a copying instruction will be described by employing FIG. 5. When a user has pressed a start button 520 in the state wherein a [Ready to print] screen 500 is displayed, the printing apparatus 100 starts a copying process (scanning and printing). The current settings, such as a magnification, a sheet size and the number of copies, are displayed on a [Ready to print] window 510. In accordance with the designation in the [Document] dialog box 400, the two-color mode and the two-color set Bk+M, as selected, are respectively indicated in a [Two-color] window 501 and a [Two-color set] window 502. When the user has selected an [Additional image] button 503, the above described [Additional image] dialog box 300 is displayed. And when the user has selected a [Detailed setting] button 504, the above described [Two-color detailed setting] dialog box 450 is displayed.

The example operation performed by the user to issue a copying instruction has been described. Next, the operations of the individual units, including a scanned image storing operation and an example data form employed, will be described while referring to the flowcharts.

(Operation for Storing Scanned Image and Data Form Employed)

Figure 6:
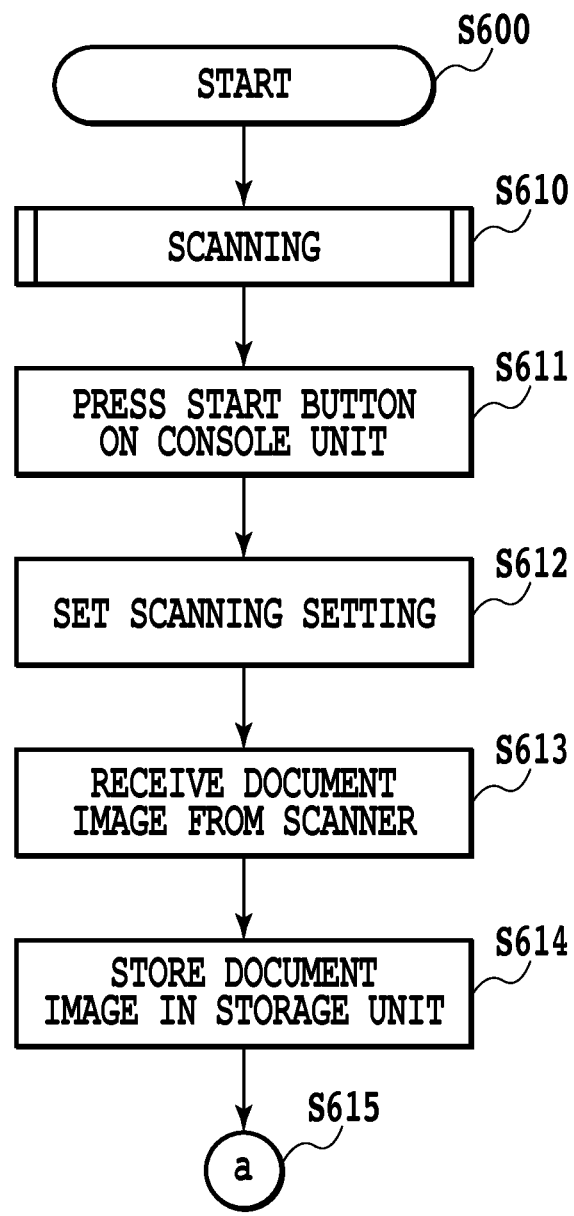
FIG. 6 is a flowchart showing the operation of the printing apparatus for storing a scanned image.
Figure 12:
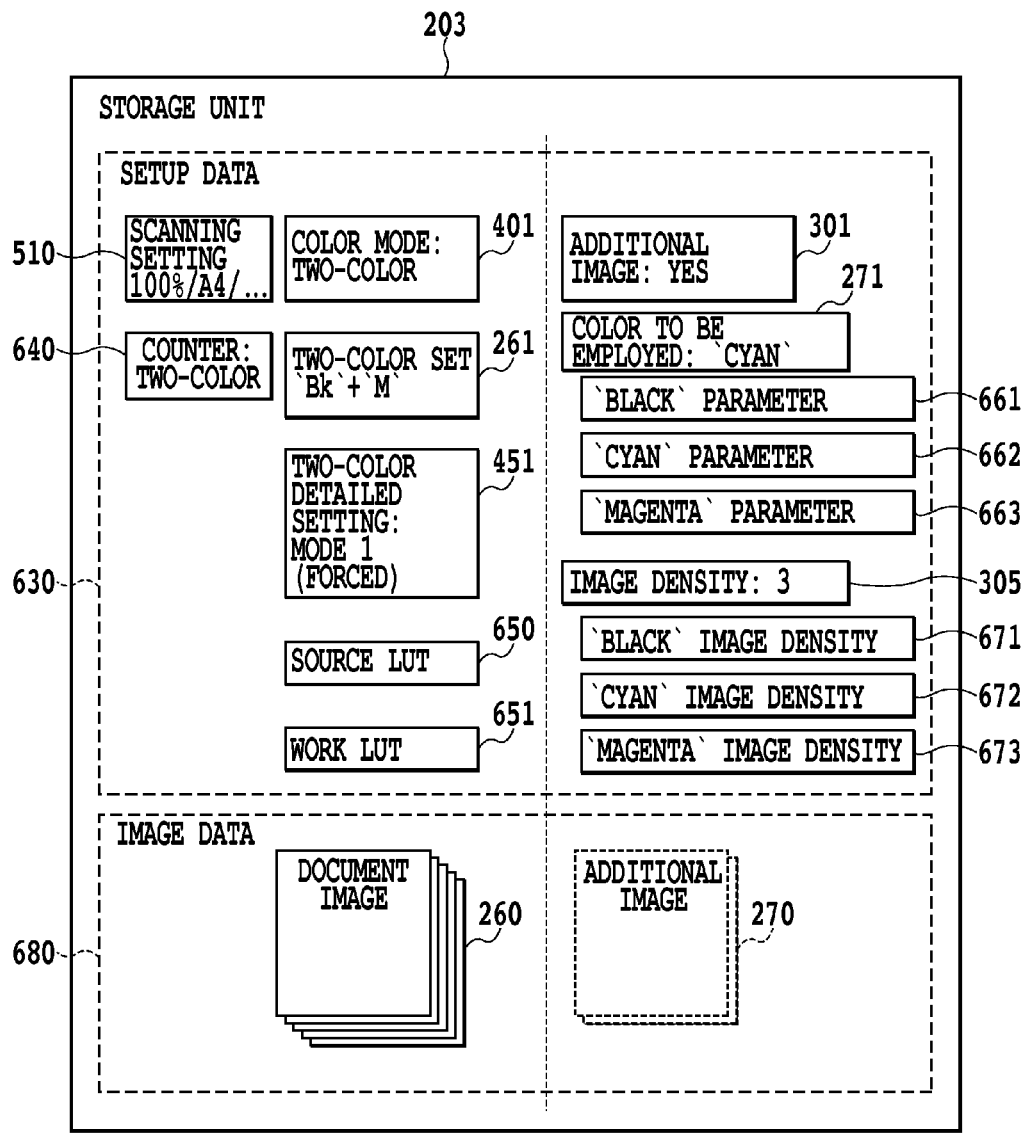
FIG. 12 is a diagram illustrating an example data form employed by the printing apparatus to store a scanned image.

FIG. 6 is a flowchart showing the operation of the printing apparatus 100 for storing a scanned image, and FIG. 12 is a diagram showing an example data form employed by the printing apparatus 100 to store a scanned image.

At step S610, the controller 202 of the printing apparatus 100 begins the scanning process. Then, at step S611, the controller 202 receives a start-button-pressed signal from the console unit 201 and sets scanning setting for scanning 200 to perform scanning at step S612. Thereafter, at step S613, the controller 202 receives the document image 260 from the scanner 200, and at step S614, stores the document image 260 in the storage unit 203. Finally, at step S615, program control for the controller 202 advances to a color decision operation a in FIG. 7.

In a case wherein a printing operation is instructed instead of a copying operation, image data for the document 250 are received as a print job from the external I/F unit 205, and data for the document image 260 can be temporarily stored in the storage unit 203. Since both the copying and the printing processes are basically performed in the same manner, while referring to flowcharts that will be described later, the following explanation can essentially be applied for either process.

The storage unit 203 will be described separately for a setup data portion 630 and for an image data portion 680. The items selected on the previously described console unit 201 and values designated in advance or data prepared separately are stored in the setup data portion 630.

The items selected on the console unit 201 are, for example, scanning setting 510, a color mode 401, the selected two-color set 261, the two-color detailed setting 451, the presence/absence 301 of an additional image, the additional image color 271 and the image density 305.

The values designated in advance or data prepared separately are, for example, data indicated in the portions denoted by broken lines in FIG. 12. [Counter: two-color] data 640 includes the number of two-color printed copies. A source LUT 650 and a work LUT 651 are look-up tables (LUTs) employed for image color conversion. A black parameter 661, a cyan parameter 662 and a magenta parameter 663 are prepared as example parameters for generating an additional image, and a black image density 671, a cyan image density 672 and a magenta image density 673 are allocated as image densities 305. These data are provided for individual colors for an additional image 270 because these colors influence the sizes of dots prepared for an additional image 270 such as a copy-forgery-inhibited pattern image. That is, in accordance with color shades and color densities selected for an additional image 270, dot sizes are controlled and the additional image 270 is generated.

The image data portion 680 includes data for the document image 260 and the additional image 270. The data for the document image 260 are stored by performing the previously described scanning operation, and the data for the additional image 270 are generated when the additional image 270 is applied to the document image 260, and are stored in the image data portion 680. Although not described in detail, the data for the document image 260 and the additional image 270 are correlated with relevant data stored in the setup data portion 630.

(Operation for Deciding on Colors to Use)

Figure 7:
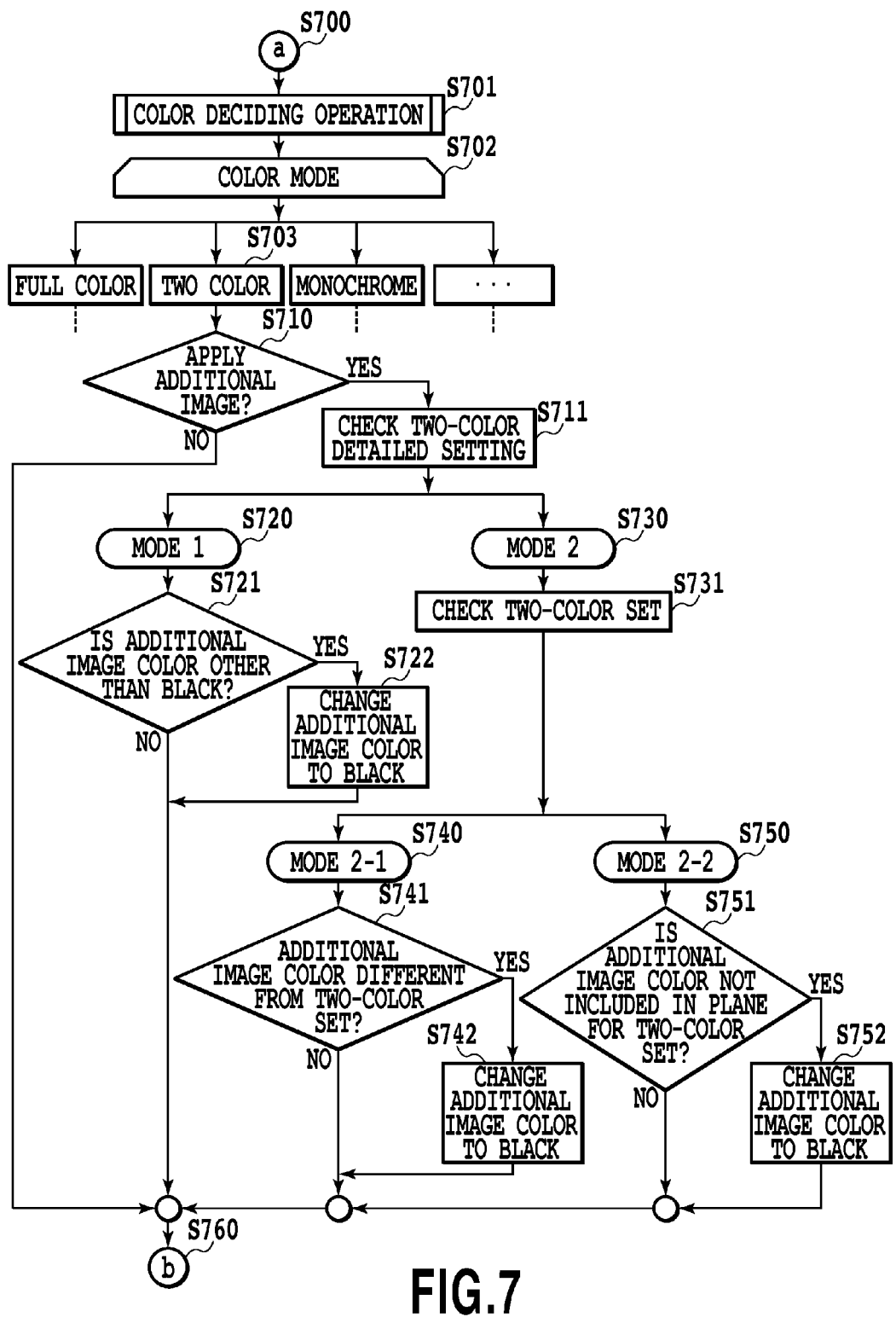
FIG. 7 is a flowchart showing an example operation of the printing apparatus for deciding on a color.

Provided in FIG. 7 is a flowchart prepared for the operation performed by the printing apparatus 100 when deciding on colors to use. The flowchart in FIG. 7 shows a continuation (a) of the processing performed in FIG. 6 by the controller 202, and at step S701, the controller 202 begins the color deciding operation. Then, at step S702, the controller 202 identifies a color mode, and in this example, it is assumed that the controller 202 determines the color mode is the two-color mode (S703).

When at step S710 the controller 202 has identified that applying of the additional image 270 is designated, the processing advances to step S711, and the controller 202 examines the two-color detailed setting.

Then, at step S711, when the controller 202 has determined mode 1 is the designated two-color detailed setting, the processing branches to step S720, and at step S721 the controller 202 examines the color selected for the additional image 270. At step S721, the controller 202 determines that the color selected for the additional image 270 is not black, the processing advances to step S722, and the controller 202 changes (sets) the color for the additional image 270 to black.

When at step S711 the controller 202 finds that the designated two-color detailed setting is mode 2, the processing branches to step S730, and at step S731 the controller 202 examines the colors of the two-color set. Then, when the controller 202 has determined that mode 2-1 is designated the two-color detailed setting, the processing branches to step S740, and at step S742, the controller 202 compares the color for the additional image 270 with both the colors in the two-color set, and when the controller 202 thereby determines that the color provided for the additional image 270 matches neither of those colors, at step S742 the controller 202 changes (sets) the color for the additional image 270 to black.

When at step S731 the controller 202 determines that mode 2-2 is the designated two-color detailed setting, the processing branches to step S750, and at step S751 the controller 202 examines the color selected for the additional image 270 to determine whether the number is included in the plane of the two-color set. When the controller 202 determines that the color for the additional image 270 is not included in the plane of the two-color set, at step S752 the controller 202 changes (sets) the color for the additional image 270 to black. Then, at step S760, the controller 202 advances to the color conversion process (b) shown in FIG. 8.

Figures 13A, 13B:
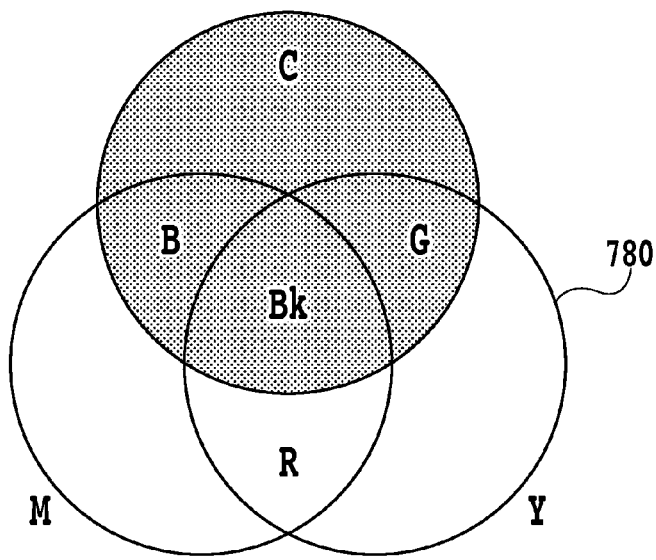
FIG. 13A is a diagram showing a table used for a supplementary explanation of an example determination performed in two-color detailed setting mode 2-2 of this embodiment.
FIG. 13B is a diagram employed for the example determination performed in the two-color detailed setting mode 2-2 of this embodiment.

FIGS. 13A and 13B are diagrams for a supplementary explanation employed for color determination in the two-color detailed setting mode 2-2 of this embodiment. A table 770 in FIG. 13A shows the colors that are actually employed for an additional image in individual cases wherein colors 1302, black, cyan and magenta (columns), are selected for two-color sets 1301, "Bk+B" to "Bk+Y" (rows). For example, when "Bk+G" is selected as a two-color set and cyan is selected as a color to be used for an additional image, in this embodiment the additional image is printed in cyan. However, when magenta is selected for an additional image while "Bk+G" is selected, the color for the additional image is changed to black.

Furthermore, in the mode 2-2, a check is performed to determine whether the color selected for an additional image is included in the plane of the colors selected for two-color printing, and when the color for an additional image is not included in the plane, this color is changed to black. For example, when the color for an additional image is cyan, and when the color (the other color, not black) selected for two-color printing is either green (G), blue (B) or cyan (C), it is ascertained that the color for the additional image is included in the plane. This will be specifically explained by employing the table 770 in FIG. 13A and a color plane 780 in FIG. 13B. When cyan is selected as one of the colors for two-color printing, the color naturally matches that for an additional image. When green (G) or blue (B) is selected for two-color printing, this color includes cyan, and cyan is included in the G or B plane. Therefore, in a case wherein cyan is selected for an additional image in the mode 2-2, this will not be changed so long as the colors included in the hatched portion of the color plane 780 in FIG. 13B, except for Bk, are selected for two-color printing.

A supplementary explanation for this example will be given. When cyan is selected as the color for an additional image and C+Bk is selected as colors for two-color printing, cyan for an additional image is included in color plane (C+Bk) of two-color printing. When cyan is selected for an additional color and B+Bk is selected for two-color printing, cyan is included in color plane (C+M+Bk) of two-color printing, as indicated by the color plane 780 in FIG. 13B. Therefore, the additional image is printed in cyan and the ordinary document is printed in B+Bk (actually, the inks in C+M+Bk are employed). That is, when either cyan, magenta or black is the selected color for an additional image, and when B+Bk is the selected color set for two-color printing, the colors actually employed for printing are C, M and Bk, and the color selected for the additional image will not be changed.

As for the processing in the mode 2-1, i.e., the comparison performed for the colors instead of the planes, when cyan is selected for an additional image and C+Bk is selected for two-color printing, naturally cyan is included in the two-color set (C+Bk), and the color for the additional image is not changed. However, when cyan is selected for an additional image and B+Bk is selected for two-color printing, cyan is not included in the printing color set (B+Bk), and in this embodiment, the color for an additional image is changed to black. Since in the mode 2-2 the color determination process is performed in the above described manner, when cyan is selected for an additional image and when G and B are selected for two-color printing, the color mode still can be regarded as the two-color mode. For example, when Bk+G is selected to print the document image 260, in the mode 2-2 the additional image is to be printed using the selected color cyan, but this process is not regarded as full color printing. In this case, the above described two-color copy counter 640 of the printing apparatus 100 can count the number of copies as two-color print products but that appear to be in three colors. Further, when counting the number of three-color copies is to be separately performed, another counter need to be prepared.

(Operation for Converting Full Colors into Two Colors)

Figure 8:
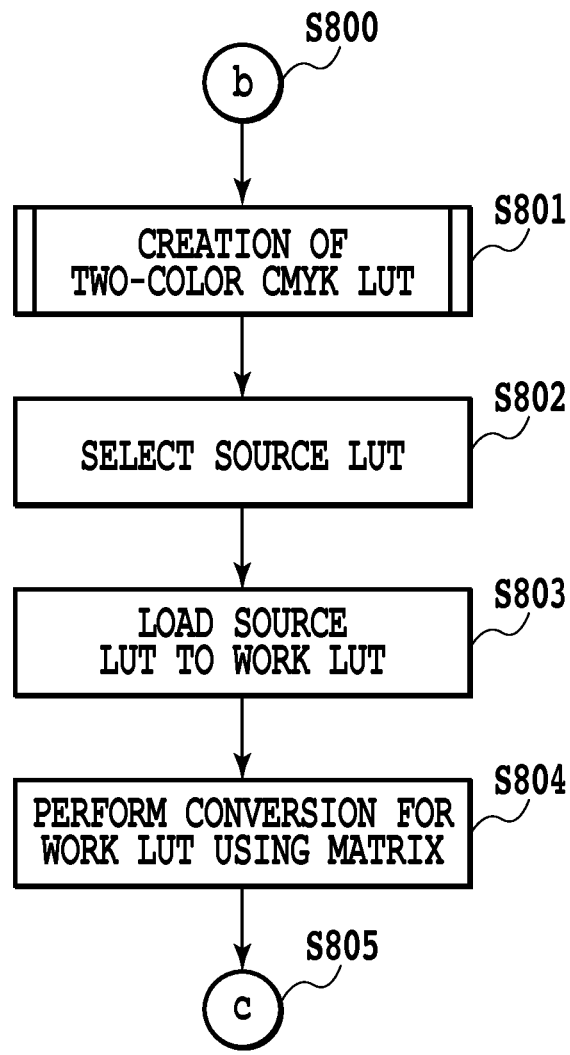
FIG. 8 is a flowchart showing an example operation of the printing apparatus for converting full colors to two colors.
Figure 14A:
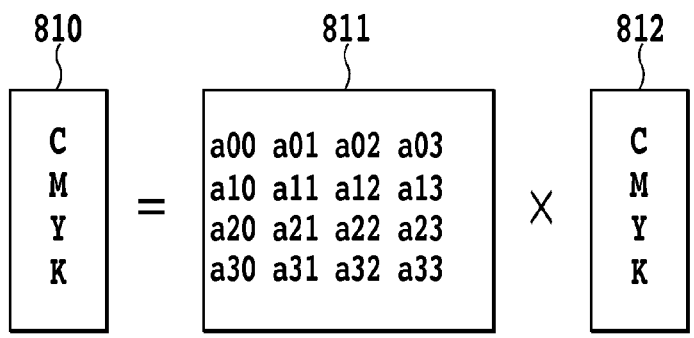
FIG. 14A is a diagram showing a conversion expression, employed by the printing apparatus of this embodiment, to convert full colors to two colors.
Figure 14B:
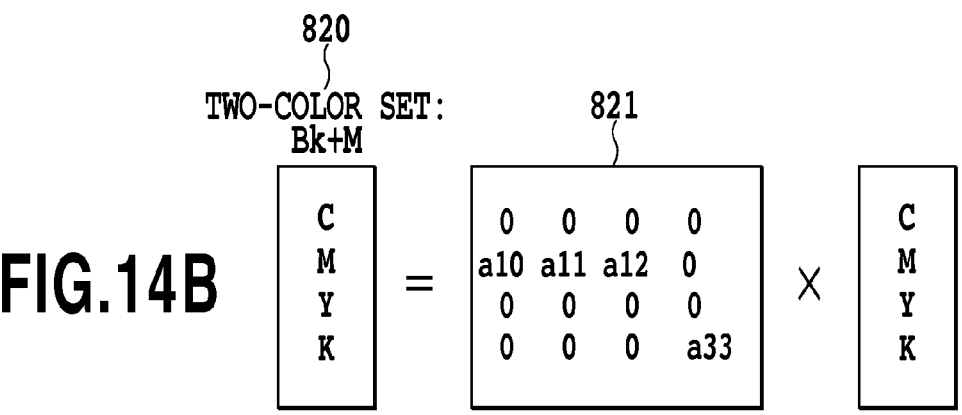
FIG. 14B is a diagram showing a conversion expression employed by the printing apparatus of this embodiment to convert full colors to two colors.
Figure 14C:
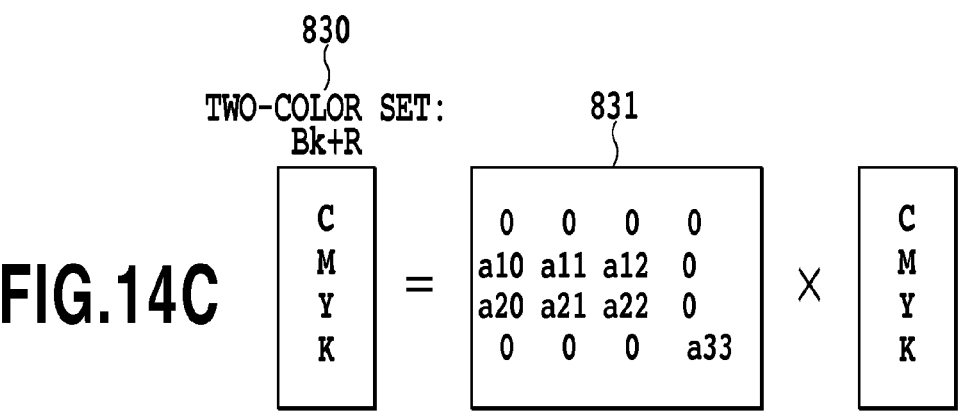
FIG. 14C is a diagram showing a conversion expression employed by the printing apparatus of this embodiment to convert full colors to two colors.

FIG. 8 is a flowchart showing the operation performed by the printing apparatus 100 when converting full colors to two colors, and FIGS. 14A, 19B and 14C are diagrams showing example matrices applied for this conversion process.

The flowchart in FIG. 8 shows a continuation (b) of the processing in FIG. 7 performed by the controller 202. At step S801, the controller 202 creates a two-color CMYK LUT. At step S802, the controller 202 selects a source LUT, and at step S803, loads the selected source LUT to a work LUT. At step S809, the controller 202 changes the work LUT by employing a matrix, and the processing advances to a flowchart c.

The printing apparatus 100 selects, from among LUTs prepared in advance, an LUT that is appropriate for the state when the printing was begun. The selected LUT is loaded as a work LUT, and matrix operations for two-color conversion are performed for the work LUT, so that a two-color CMYK LUT is obtained. This matrix operation will now be described. FIGS. 14A, 14B and 14C are diagrams for explaining example matrices to be employed. An output CMYK 810 can be obtained by performing a matrix operation for an input CMYK 812 using a 4×4 matrix 811. For example, when a selected color set for two-color printing is Bk+M, a matrix 821 indicating the output of only Bk and M is employed to convert the input CMYK 812 into an output CMYK 820. When Bk+R is selected for colors for two-color printing, a matrix 831 indicating the output of only Bk and R, i.e., M and Y, is employed to convert the LUT to an output CMYK 830.

In this example, the sum of the coefficients for the rows of a matrix is generally one, and the following are example coefficients of a matrix 831. However, these coefficients may be adjusted depending on the recording agent or the CMYK materials employed by the printing apparatus 100.

$a10+a11+a12=1$ $a20+a21+a22=1$ $a33=1$

The operation for converting full colors to two colors has been described. When the two-color conversion LUT thus generated is employed for printing images, a two-color image is obtained. The flowchart for the printing operation will now be described.

(Operation Performed when a Printing Instruction is Issued)

Figure 9:
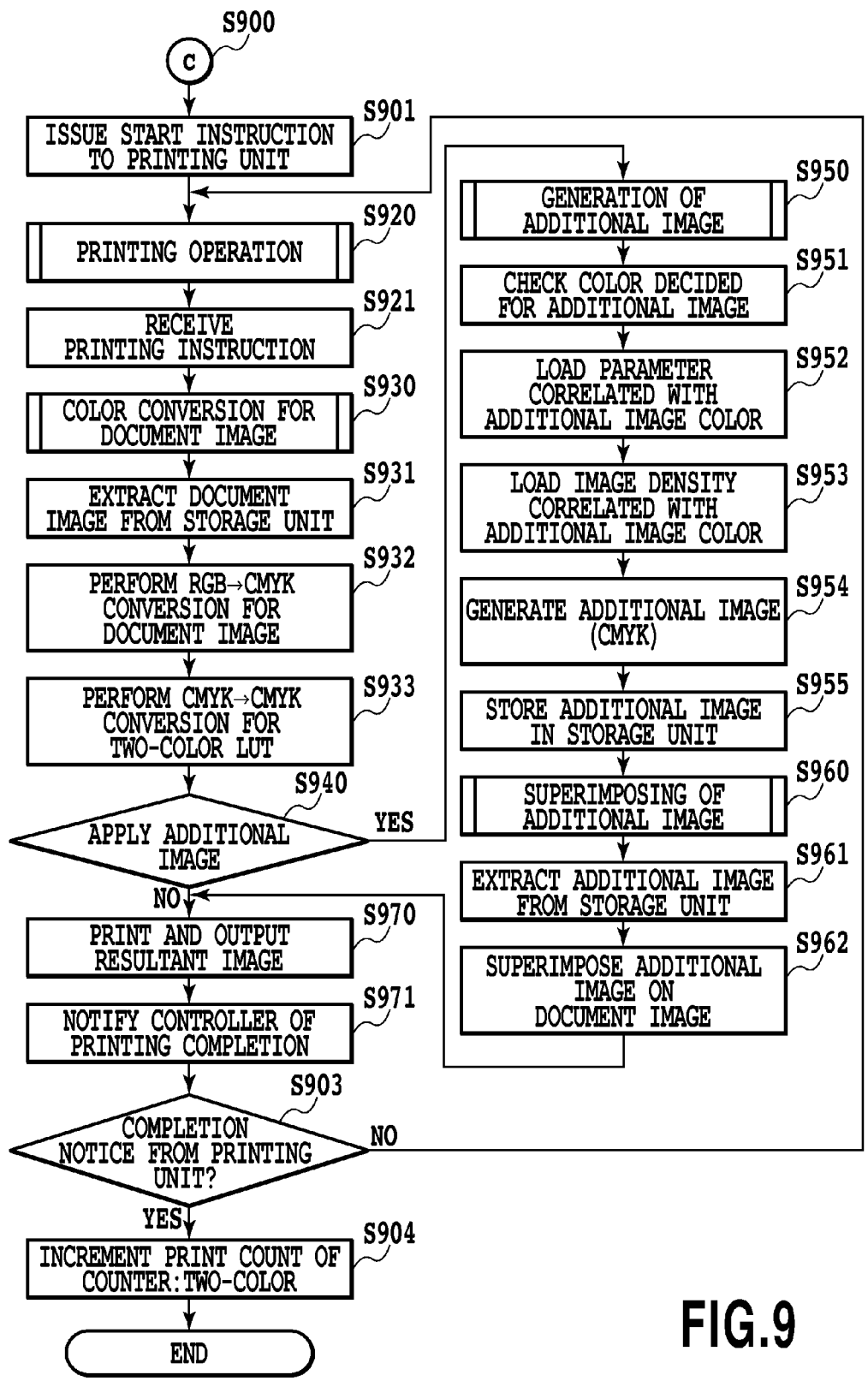
FIG. 9 is a flowchart showing an example operation of the printing apparatus for issuing a printing command.

FIG. 9 is a flowchart for the operation performed by the printing apparatus 100 when a printing instruction has been issued. The flowchart in FIG. 9 shows a continuation (c) of the processing in FIG. 8 performed by the controller 202. At step 901, the controller transmits a printing start instruction to the printing unit 204.

At step 920, the printing unit 204 begins the printing operation. At step 921, the printing unit 204 receives a printing instruction from the controller 202, and at step S930, starts the color conversion process for the document image 260. At step S931, the printing unit 204 extracts data for the document image 260 from the storage unit 203, and at step S932, converts the extracted data from RBG into CMYK data. At step S933, the printing unit 204 employs a two-color LUT to perform further conversion of the CMYK data, and obtains two-color CMYK data.

When at step S940, the printing unit 204 determines that application of the additional image 270 is designated, at step S950 generation of an additional image is started. At step S951, the printing unit 204 confirms the color selected for an additional image 270, and at step S952, loads a parameter associated with the color for the additional image. At step S953, the printing unit 204 loads the additional image density that is correlated with the color selected for the additional image 270.

At S954, the printing unit 204 generates data (CMYK) for the additional image 270, and at step S955, stores the data in the storage unit 203. At step S960, the printing unit 204 initiates the superimposing process for the additional image 270. Specifically, at step S961, the printing unit 204 extracts data for the additional image 270 from the storage unit 203, and at step S962, superimposes the additional image 270 on the document image 260. At step S970, the printing unit 204 outputs the superimposed image by printing, and at step S971, transmits a printing completed notification to the controller 202.

When at step S903 the controller 202 receives a printing completed notification from the printing unit 204, at step S904 the controller 202 increments the number of two-color copies held by the [counter: two-color], and ends the processing.

In the processing performed in this flowchart, the process for generating the document image 260 and the process for generating the additional image 270 are performed in a serial manner. However, these generation processes may be performed in parallel and the document image 260 and the additional image 270 may be thereafter superimposed. Further, a color conversion process may be performed for an image obtained by superimposing the document image 260 on the additional image 270.

A loop performed for each page in a print job has not been described above. This is because, for example, the performance of the generation of the additional image 270 is required only once in a print job, and is not necessary for every page.

The operation performed upon issuance of the printing instruction has been described by employing the flowcharts.

The processing performed by the printing apparatus 100 has been described. The effects produced by of the printing apparatus 100 of the present invention will again be summarized below.

Description of Effects Provided by the Embodiment

In the conventional two-color printing mode wherein the print color selector selects a color set for two color printing and the additional image color selector selects a color for an additional image, such as a copy-forgery-inhibited pattern image, when the color for the additional image is changed to a color other than black, the process for generating and printing an additional image is not appropriately performed as follows:

a) An additional image, such as a copy-forgery-inhibited pattern image, is formed and printed using a color that is not included in the colors selected for two-color printing.

b) An additional image, such as a copy-forgery-inhibited pattern image, is printed using dots that do not match in color (so is printed using dots of at least two different colors).

c) An additional image, such as a copy-forgery-inhibited pattern image, is similar to the background in color, and the effects provided, such as copy-forgery-inhibited pattern copy discouraging effectiveness, are reduced.

To resolve these problems, the present invention provides the following. The forced Bk selector for designating the color for printing an additional image to black has been described. In addition to this forced Bk selector, the printing apparatus of this invention includes two flexible Bk selectors that determine the color for an additional image by performing a comparison with the two colors of a document image.

Whether the additional image color is included in colors for two-color printing is determined, and when it is ascertained that the additional image color is not included, the additional image color is changed to black to perform printing. The printing apparatus also includes two units: a color disagreement Bk selector and a plane disagreement Bk selector, which determines whether the plane for an additional image color is included in the plane for a color set for two-color printing, and when the plane for an additional image color is not included, designates black as the color for printing an additional image.

The printing apparatus further includes a counter that counts the number of copies as two-color print products are provided by these printing operations. The forced Bk selection is regarded as mode 1, flexible color selection is regarded as mode 2, color disagreement Bk selection is mode 2-1, and plane disagreement Bk selection is mode 2-2.

The printing apparatus of this invention also includes a mode setting unit for selecting one of the three modes, mode 1, mode 2-1 and mode 2-2, and a mode identifying and operating unit for identifying a selected mode and performing an operation in the selected mode. The printing apparatus of this invention is preferably arranged to implement at least one of the modes (1, 2-1 and 2-2) described above and may be arranged to implement two of the modes described above.

As a result, improving consistency, saving operating power and increasing security can be obtained as follows.

A) Print data are handled as data for two-color printing even when an additional image is applied. When an additional image is applied to a document, the printing mode will not be converted to the full-color mode.

B) Since the color for an additional image is automatically adjusted, the operation for a user is eliminated. The color for an additional image need not be changed in consonance with the colors selected for two-color printing.

C) Since an additional image is printed in black, security is increased. It is very difficult to lose the quality of the additional image in black printing.

The effects obtained by the system of this invention have been described. When the arrangement or the data form employed for the printing apparatus 100 described above is changed, e.g., when part of the configuration is installed in another apparatus, or part of the data is distributed in another location, the whole system is still regarded as being the same as when employed only for the present invention.

The present invention may be applied either for a system that includes a plurality of apparatuses, such as a computer, an interface device, a reader and a printer, or for a single apparatus, such as a copier, a printer or a facsimile machine.

Other Embodiment

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-038827, filed Feb. 29, 2010, which is hereby incorporated by reference herein in its entirety.

What is claimed is:

1. An apparatus comprising:
   a printing unit including N color materials which include a black material;
   a first selector configured to select M color materials to be used for printing by the printing unit of a document image based on a designation received from a user, wherein M is bigger than one and smaller than N; and
   a second selector configured to select a color material for an additional image based on a designation received from a user,
   wherein in a case where the first selector has selected M color materials and the second selector has selected a color material for the additional image, the printing unit uses a black material to print the additional image instead of the selected color material for the additional image and uses the selected M color materials to print the document image even though the selected color material for the additional image is not a black material and is included in the selected M color materials.

2. The apparatus according to claim 1, wherein the M color materials include a black material.

3. A method for processing in an apparatus which comprises a printing unit including N color materials which include a black material, the method comprising the steps of:
   first selecting M color materials to be used for printing by the printing unit of a document image based on a designation received from a user, wherein M is bigger than one and smaller than N; and
   second selecting a color material for an additional image that is to be applied to the document image based on a designation received from a user,
   wherein in a case where M color materials have been selected in the first selecting and a color material for the additional image has been selected in the second selecting, the printing unit uses a black material to print the additional image instead of the selected color material for the additional image and uses the selected M color materials to print the document image even though the selected color material for the additional image is not a black material and is included in the selected M color materials.

4. A non-transitory computer readable medium storing instructions that permits a computer to perform a method for processing in an apparatus which comprises a printing unit including N color materials which include a black material, the method comprising the steps of:

first selecting M color materials to be used for printing by the printing unit of a document image based on a designation received from a user, wherein M is bigger than one and smaller than N; and second selecting a color material for an additional image that is to be applied to the document image based on a designation received from a user, wherein in a case where M color materials have been selected in the first selecting and a color material for the additional image has been selected in the second selecting, the printing unit uses a black material to print the additional image instead of the selected color material for the additional image and uses the selected M color materials to print the document image even though the selected color material for the additional image is not a black material and is included in the selected M color materials.

5. A system comprising:

a printing unit including N color materials which include a black material;

a first selector configured to select M color materials to be used for printing by the printing unit of a document image based on a designation received from a user, wherein M is bigger than one and smaller than N; and a second selector configured to select a color material for an additional image based on a designation received from a user, wherein in a case where the first selector has selected M color materials and the second selector has selected the color material for the additional image, the printing unit uses a black material to print the additional image instead of the selected color material for the additional image and uses the selected M color materials to print the document image even though the selected color material for the additional image is not a black material and is included in the selected M color materials.

\* \* \* \* \*